United States Patent
Sridharan (10) Patent No.: US 10,445,185 B1
(45) Date of Patent: *Oct. 15, 2019

(54) VERSION MAPPED INCREMENTAL BACKUPS

(71) Applicant: VERITAS TECHNOLOGIES LLC, Mountain View, CA (US)

(72) Inventor: Srineet Sridharan, Pune (IN)

(73) Assignee: Veritas Technologies LLC, Santa Clara, CA (US)

( * ) Notice: Subject to any disclaimer, the term of this patent is extended or adjusted under 35 U.S.C. 154(b) by 443 days.

This patent is subject to a terminal disclaimer.

(21) Appl. No.: 14/683,632

(22) Filed: Apr. 10, 2015

Related U.S. Application Data (63) Continuation of application No. 11/392,382, filed on Mar. 29, 2006, now Pat. No. 9,158,781, which is a continuation of application No. 11/262,568, filed on Oct. 31, 2005, now Pat. No. 9,009,114.

(51) Int. Cl.
| | |
|---|---|
| *G06F 7/00* | (2006.01) |
| *G06F 11/14* | (2006.01) |
| *G06F 16/11* | (2019.01) |
| *G06F 16/18* | (2019.01) |

(52) U.S. Cl.
CPC ........ *G06F 11/1451* (2013.01); *G06F 16/128* (2019.01); *G06F 16/1873* (2019.01); *G06F 2201/84* (2013.01)

(58) Field of Classification Search
CPC .................................................... G06F 16/128
USPC ................................................ 707/802, 821
See application file for complete search history.

(56) References Cited

U.S. PATENT DOCUMENTS

| | | | | |
|---|---|---|---|---|
| 4,764,896 A | * | 8/1988 | Freimark | G06F 13/28 710/3 |
| 5,167,558 A | * | 12/1992 | Duchek | H01J 29/073 445/30 |
| 5,404,361 A | * | 4/1995 | Casorso | G06F 11/1076 714/52 |
| 5,410,667 A | * | 4/1995 | Belsan | G06F 3/0601 707/999.202 |
| 5,459,857 A | * | 10/1995 | Ludlam | G06F 11/2071 714/6.12 |
| 5,581,724 A | * | 12/1996 | Belsan | G06F 11/1076 711/113 |
| 6,233,589 B1 | * | 5/2001 | Balcha | G06F 16/10 707/625 |
| 6,611,537 B1 | * | 8/2003 | Edens | H04L 12/2803 348/E7.05 |
| 6,826,627 B2 | * | 11/2004 | Sjollema | H04L 29/06 709/220 |

(Continued)

*Primary Examiner* — Eliyah S. Harper
(74) *Attorney, Agent, or Firm* — Campbell Stephenson LLP (57) ABSTRACT

A method to create a version map to represent the data state of a file at a particular point in time when an incremental backup is performed. In one embodiment, a logical memory backup file is created that is known as a cumulative data file. Changes to the cumulative data file according to one embodiment of the present invention include appending copies of modified data when the modified data meets a certain condition. A new version map may be created each time an incremental backup occurs. Locations of both modified and unmodified data in the backup data file are mapped for future reference to the data.

14 Claims, 6 Drawing Sheets

(56) References Cited

U.S. PATENT DOCUMENTS

| | | |
|---|---|---|
| 7,487,138 B2 * | 2/2009 | Borthakur ............... G06F 16/10 |
| 2003/0149856 A1 * | 8/2003 | Cernea .................. G06F 3/0614 |
| | | 711/202 |
| 2005/0028046 A1 * | 2/2005 | McArdle ............... G06F 16/215 |
| | | 714/48 |

* cited by examiner

VERSION MAPPED INCREMENTAL BACKUPS

CROSS-REFERENCE TO RELATED APPLICATIONS

The present patent application is a continuation of U.S. application Ser. No. 11/392,382, filed on Mar. 29, 2006, entitled "VERSION MAPPED INCREMENTAL BACKUPS WITH VERSION CREATION CONDITION, which is a continuation of U.S. patent application Ser. No. 11/262,568, filed on Oct. 31, 2005, entitled "VERSION MAPPED INCREMENTAL BACKUPS", which will issue as U.S. Pat. No. 9,009,114 on Apr. 14, 2015 and is incorporated by reference herein in its entirety and for all purposes.

FIELD OF THE INVENTION

This invention relates to incremental backups in a computer system and, more particularly, to storing multiple versions of data in a system implementing incremental backups.

DESCRIPTION OF THE RELATED ART

With the increasing size and complexity of modern computer systems, different techniques to backup and restore data have been developed. As computer systems increase in size and complexity, the difficulty to backup and/or restore data of the computer systems in an efficient and organized manner has also increased. There are usually two types of backup operations: full and incremental. A full backup operation typically involves copying all data accessible by a computer system called the client to backup media on a system called the backup server. Incremental backup operations are repeated periodically over time after a full backup operation to capture any changes in the data. In other words, incremental backup operations have been tailored to copy only the data that has changed since the most recent full or incremental backup operation. In some cases, a different backup media device (e.g., magnetic tape) is used for each incremental or full backup operation.

Incremental backups frequently target only files of a file system that have changed since the previous backup operation was performed. If a file has been changed since the previous backup, all the contents of the changed file is saved to the backup server. Targeting the changed files avoids duplicating backups of files that have not been modified. Unfortunately, files may contain large amounts of data, and only slight changes to a small portion of the file data may occur since the last backup. Incremental backups on a file level are unsatisfactory because all data of the file is copied to backup media even though only a small portion of the file has changed.

In an effort to avoid problems with backing up data on a file level, "block level" incremental backups have been introduced. File data is stored in logical memory consisting of contiguous memory blocks of preset size (e.g., 512 bytes). A block level incremental backup copies only the blocks that have changed since the previous backup. Such methods may require support from data sources to enable tracking of write operations and to track modified blocks from the files.

Restoring the data state of a file to a prior point in time after several incremental backups is a complicated and time consuming procedure when different backup copies of the file are stored on different backup tapes. In such a situation, restoring the file requires access to both a tape that holds the initial full backup copy of the file and tapes that hold respective, subsequent incremental backups of the file. For this reason, it is more convenient to avoid incremental backups, and copy all the data to respective tapes during each backup operation.

What is needed is a system for performing a backup in a manner that does not copy data unchanged from the previous backups, yet performs the backups in an organized manner using a single logical memory such that restoration of specific data to a prior point in time can be performed without compromising system resources by inefficient usage of system bandwidth and storage media.

SUMMARY

Various embodiments of methods and systems for mapping incremental backups are disclosed herein. In one embodiment, a method involves creating a version map to represent the data state of a file at a particular point in time when an incremental backup is performed. In an embodiment, a logical memory backup file is created that is known as a cumulative data file. Changes to the cumulative data file according to one embodiment of the present invention include periodically appending copies of data modified since the prior backup. A new version map may be created each time an incremental backup occurs.

Locations of data in the cumulative data file are mapped for future reference to the data. This mapping may occur when a backup condition is met in the computer system. The backup condition could be any number of conditions such as a particular length of time since last backup, a specific amount of data being changed since last backup, a particular type of data being changed since last backup, and so forth. In addition, the mapping may include creating an extent specifier to point to a particular region of the cumulative data file. The extent specifier points to a location where data of the region is stored in the cumulative data file, and also defines the length of the data that is included in the region pointed to by the extent specifier. In one embodiment, once an extent specifier is created, it is appended to a previously created extent specifier.

Data may be restored to a prior point in time from the cumulative data file using the mapped data locations. In one embodiment, such as when restoring data from a tape backup of the cumulative data file according to the mapped data locations, data regions may be retrieved from the cumulative data file in the order that the data regions appear in the cumulative data file. During or after retrieval, the regions are organized to form the restored file on a hard disk.

A system according to one embodiment of the present invention includes a computer readable storage media for storing a cumulative data file. As discussed, the cumulative data file is formed from data available for use in a client computer system. The cumulative data file initially includes a copy of all data from the computer system and, in addition, may also subsequently include at least one copy of data modified since the cumulative data file was initially created. The system also includes a mapping module configured to map locations of the most recent copies of data in the cumulative data file.

Variations of the system include the mapping module being configured to map the locations of the most recent copies of data in the cumulative data file when a version creation condition is met in the computer system. The mapping module may be configured to create an extent specifier to point to a particular data region of the cumulative data file where data of the region is stored and to define a number of bytes of data that is included in the region pointed to by the extent specifier. The extent specifier may be appended to a previously created extent specifier to form a version map.

Other variations of the system include the cumulative data file being associated with at least one extent specifier to point to a beginning of the data that is copied to form the cumulative data file and to define a length for the data identified by the extent specifier. The extent specifiers may be used to form a version map to represent a data state of a file from the most recent copies of data in the cumulative data file.

The system may include a processor that is configured to restore data to a prior state using the version map. Data in a file can be restored from the cumulative data file in the order that the data appears in the file being restored. The processor may also be configured to restore data to a prior state using the mapped data locations in the cumulative data file. For example, the processor could retrieve data from successive regions of the cumulative data file when restoring a file to a prior data state.

Other variations of the invention are contemplated and disclosed in the following detailed description. The foregoing is a summary and thus contains, by necessity, simplifications, generalizations and omissions of detail; consequently those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

A more complete understanding of the present invention may be acquired by referring to the following description and the accompanying drawings, in which like reference numbers indicate like features.

While the invention is susceptible to various modifications and alternative forms, specific embodiments of the invention are provided as examples in the drawings and detailed description. It should be understood that the drawings and detailed description are not intended to limit the invention to the particular form disclosed. Instead, the intention is to cover all modifications, equivalents and alternatives falling within the spirit and scope of the invention as defined by the appended claims.

DETAILED DESCRIPTION

The following is intended to provide a detailed description of an example of the invention and should not be taken to be limiting of the invention itself. Rather, any number of variations may fall within the scope of the invention which is defined in the claims following the description.
Introduction Using a client/server architecture, a system and method are described for creating incremental backups in a way that the incremental backups can be made to a logical memory. The backup to logical memory may allow a point in time restore of a file, file system space, volume, etc., with its incremental backups, all from logical memory. The logical memory could be created from one or more physical devices such as a tape or hard disk. The incremental backups in one embodiment are made to the logical memory by appending or adding the incremental updates to the original/previous backup file. Hence, although this disclosure sometimes refers to a single backup file being created for the backups, the backup file could be split and stored across file systems in a form such as fragments. The periodic incremental backups are tracked by mapping the storage location of any changes in the backup file.

Description of Illustrated Embodiment

Figure 1:
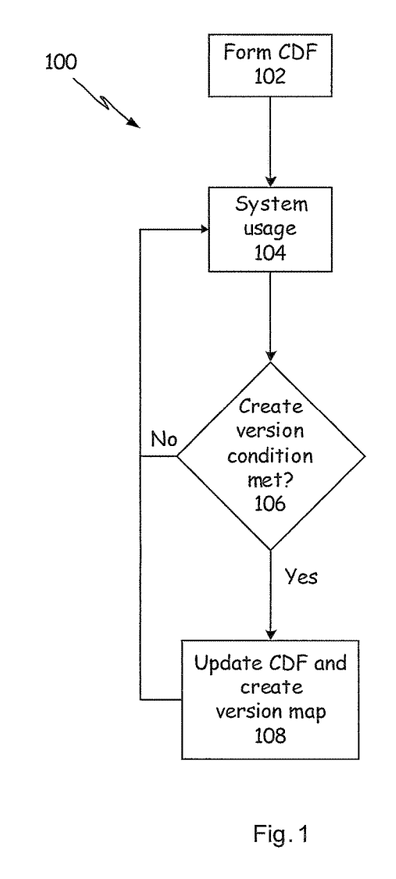
FIG. 1 is a flow diagram of backup operations that are performed in a computer system according to one embodiment of the present invention.

FIG. 1 is a flow diagram 100 of a backup operation that is performed in a computer system 700 (see FIG. 7 and description) according to one embodiment of the present invention. The method of the flow diagram 100 begins at process block 102 where forming an initial "cumulative data file" (CDF) is depicted. Although a separate cumulative data file could be formed for selected data such as a file within a system, the present disclosure refers to the cumulative data file being formed from all of the data available for use by a computer system. An initial cumulative data file is a full copy of data available for use by computer system 700. The data of the full copy is considered herein to be unmodified data. As described in greater detail in relation to FIGS. 2, 3, and 4, the cumulative data file will include copies of data modified since the full backup or since a prior incremental backup. Data copied to the cumulative data file subsequent to the initial creation of the cumulative data file will be referred to herein as modified data. Modified data includes data that has been changed to include portions of new data, deleted data, or simply changed data.

Figure 7:
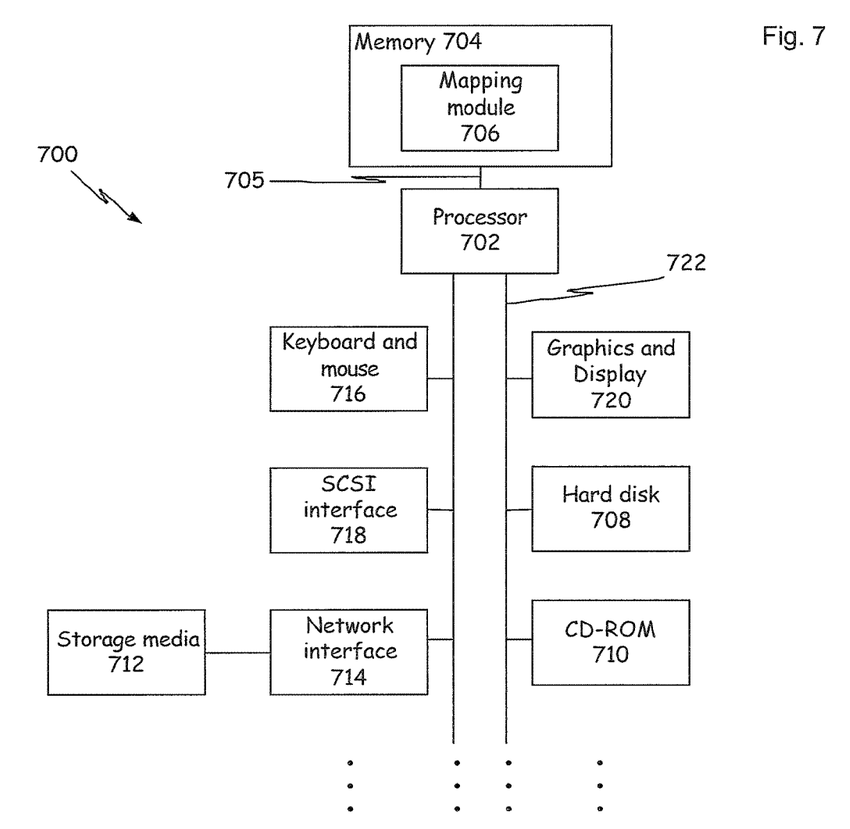
FIG. 7 is a block diagram of an exemplary system for performing version mapped incremental backups according to one embodiment of the present invention.

Process block 104 illustrates system usage of the computer system 700 of FIG. 7. The system usage of process block 104 merely represents that the computer system 700 is in use. For example, for system usage, a user could be modifying data in a file of the computer system 700 through a word processor. The computer system 700 periodically checks to determine if an update should be made to the cumulative data file in accordance with an incremental backup operation. If no update is to be made, system usage continues at process block 104.

Decision block 106 represents the computer system 700 making a decision whether to update the cumulative data file with recently modified data (i.e., data modified since the last backup). If a condition is met (e.g., a predetermined length of time passed since the last backup), the cumulative data file is updated. Any modifications that were made to the data since the previous update are appended to the cumulative data file as modified data, and locations of modified and unmodified data copied to the cumulative data file are mapped to allow efficient retrieval of data when the computer system 700 chooses to restore a particular file to a prior state. This mapping information is stored in a file that is sometimes referred to as a "version map."

It should be noted that, rather than requiring a length of time to pass to meet a mapping condition, the mapping condition could be met by changing a particular amount of data available to the computer system 700. Still further, the mapping condition could be met by changing a particular type of data such as data that is set with a high priority for backup when it is modified. It is contemplated that still other types of mapping conditions could trigger a backup operation which updates the cumulative data file and creates a new version map. The version creation conditions of time, amount of data changed, or type of data changed are described for purposes of example only.

When a mapping or "create version" condition is met at decision block 106, flow diagram 100 moves to process block 108 where the cumulative data file is updated and a new version map is created. The cumulative data file is updated by identifying data which has been modified since its last backup and appending a copy of the modified data to the cumulative data file or adding the copy of the modified data to the logical memory that stores the cumulative data file so that the cumulative data file remains unchanged except for the modified data appended or added thereto. Essentially, when a mapping condition is met, an incremental backup appends modified data to the cumulative data file or adds the modified data to the logical memory storing the cumulative data file. As described in more detail with regard to FIGS. 2-5, an updated version map is created to track locations of modified and/or unmodified data in the cumulative data file that is needed to restore the client data to the data state at the time the version map was created in process block 108.

Figure 2:
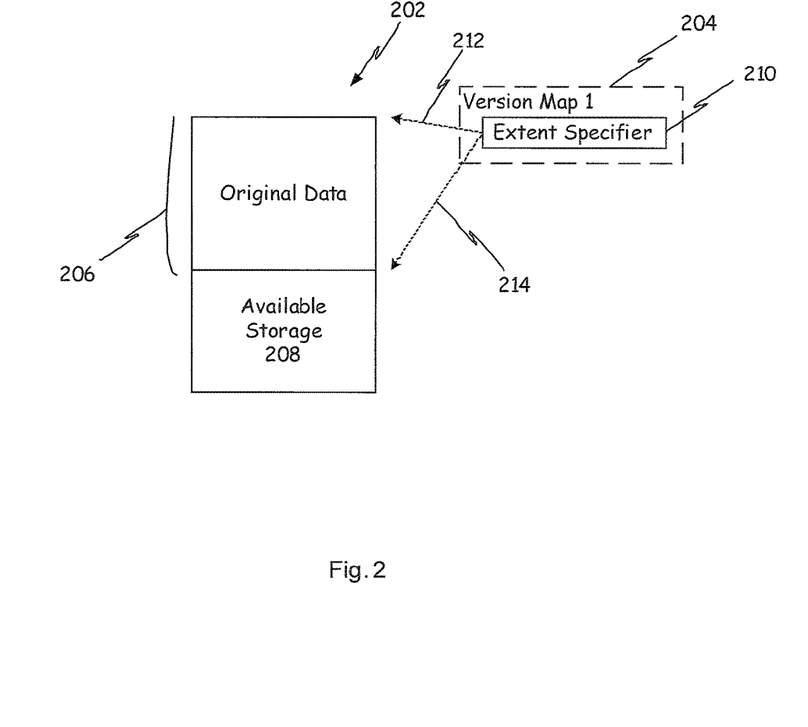
FIG. 2 is a block diagram of an exemplary cumulative data file and version map that may be created for the version mapped incremental backup operations in the computer system of FIG. 1.

Returning to the description of process block 102, a first version map is created when the cumulative data file is first formed (see FIG. 2). After the first version map is created, as described above, flow diagram 100 moves to process block 104 where system usage occurs. If the computer system determines that a condition has been met to restore for example, a file, the file is restored using the cumulative data file and using a specified version map. If only the first version map has been created, the restore must be performed from that version map. However, if multiple version maps have been created that correspond to respective backup operations, a particular version map may be specified and used for restoring the file from the cumulative data file. For purposes of understanding the present invention, the figures are illustrated as showing backups and/or restoring of single files only; however, other embodiments are contemplated wherein file systems, file space, volumes, and/or complete computer systems are backed up or restored using a cumulative data file and version map. In certain embodiments, the backups may be performed on a byte level. The restore procedure is described in greater detail with relation to FIGS. 6A and 6B.

FIG. 2 is a block diagram of an initial cumulative data file 202 and an initial version map 204 that may be created from the version mapped incremental backup operations. The cumulative data file 202 and version map 204 may also be used to restore data to the data state it occupies at the time version map 204 and cumulative data file 202 were created. The cumulative data file 202 and version map 204 are stored on a computer readable media. The computer readable media for storing the cumulative data file 202 and version map 204 may be a hard drive that is part of the computer system 700. In other embodiments, the computer readable media that stores version map 204 and cumulative data file 202 is accessible remotely to the computer system 700 such as from a hard drive through a wired or wireless network. The computer readable media may also include secondary storage media such as an optical storage drive or magnetic tape drive, or include some other media familiar to those of ordinary skill in the art.

As illustrated, the initial cumulative data file 202 includes only two portions, i.e., a full copy of the original data 206 and an available storage portion 208 that will store copies of modified data identified during incremental backups. The available storage portion 208 is the portion of the cumulative data file 202 that is available to receive and store copies of data modified subsequent to creation of initial cumulative data file 202 when a create version condition is met (e.g., process block 108). The cumulative data file 202 is updated when it receives and stores modified data. Since no data has been modified since the initial cumulative data file 202 was created, the initial version map 204 is fairly simple. However, subsequently created version maps may become more complex.

In one embodiment, version maps include "extent specifiers" to track data copied to the cumulative data file. Extent specifiers of a version map are organized in some fashion to identify the location and length of data regions of both the modified data that is appended to the cumulative data file and/or the location and length of the data in regions of the remaining original/unmodified data. The extent specifiers can identify "regions" or variable amounts of data from the original cumulative data file. Regions rather than blocks or segments or the like are used to contain the data of an extent specifier because in some embodiments, different regions may contain different amounts of data and a region size may change between version map creations. The extent specifiers are organized to form a map (version map) that may be used to locate a backup copy of data that existed at a particular point in time.

In one embodiment, an extent specifier will have only two operands for tracking data in a cumulative data file. One operand identifies the start location of a region of data from the cumulative data file. The other operand identifies the length or number of bytes of the data of the region, the beginning location of which is identified by the first operand of the extent specifier. In this embodiment, the extent specifiers of a version map are organized so that when a file is restored using the version map, data identified by each of the extent specifiers is retrieved from the backup media in the order of the extent specifiers. For example, extent specifiers could be ordered in the version map such that when a file is restored to a prior data state using its version map, the data identified by each extent specifier is appended in the order that the extent specifier appears in the version map.

In another embodiment, extent specifiers could include more than two operands. For example, a version map can be created in which the extent specifiers are ordered to enable data retrieval in a linear fashion from the backup media, such as a tape backup, which in turn reduces the time needed to reverse and forward the backup tape in order to properly position the read/write head, which in turn reduces the time needed to complete a restore operation. The data regions being retrieved from the tape backup are retrieved in the order that the data regions appear on the tape (beginning with the front end of the tape) regardless of the order that the data regions appear in the file (beginning with its starting address) that is being restored. In this embodiment, a third operand may be necessary in the extent specifier to identify the location in the file being restored where the retrieved data region should be written after being retrieved from the tape backup. In this way, a file could be restored from a tape of incremental backups with only a pass of the tape. Thus, extent specifiers are created and ordered to allow restoring of a single file to a prior, specific point in time that is represented by a version map, whether restoring from hard drive or tape.

Returning to FIG. 2, the version map 204 includes one extent specifier 210. For purposes of explanation, the extent specifier 210 contains only two operands for tracking data in the cumulative data file 202. As shown by arrow 212, a first operand points to the start offset or beginning of the original data 206 that has been copied to the cumulative data file 202. The second operand represents the number of valid data bytes that follow the start offset location pointed to by the first operand. Arrow 214 represents the second operand, which in this case shows that all of the original data 206 initially copied to the cumulative data file is included because the arrow 214 points to the beginning of the available storage 208.

Figure 3:
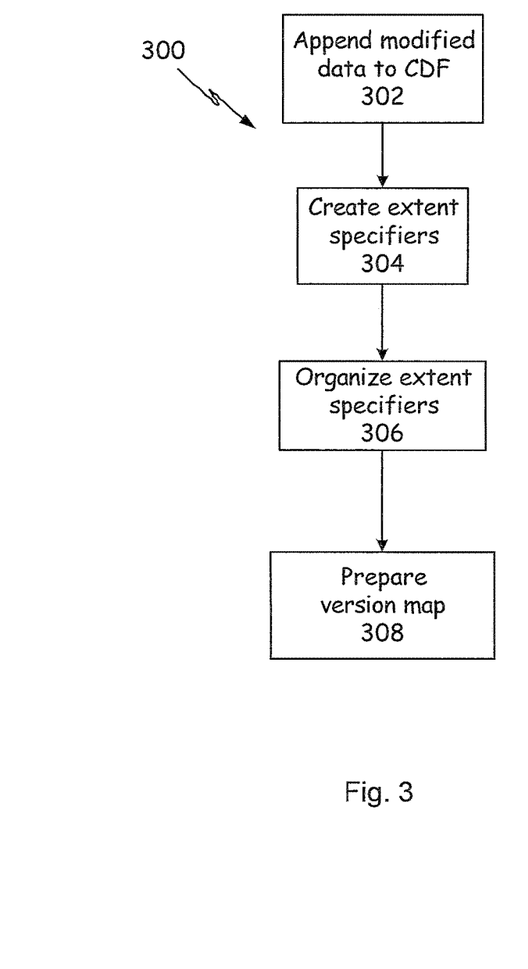
FIG. 3 is a flow diagram showing a process to update the cumulative data file of FIG. 2 and to create a new version map to accompany the updated cumulative data file as illustrated in FIG. 4A.

FIG. 3 is a flow diagram 300 showing process block 108 of FIG. 1 in more detail. Flow diagram 300 illustrates a process to perform a version mapped, incremental backup by appending data modified since the last backup to the cumulative data file 202 of FIG. 2. Flow diagram 300 also illustrates creating a new version map to accompany an updated cumulative data file according to one embodiment of the present invention.

Figure 4A:
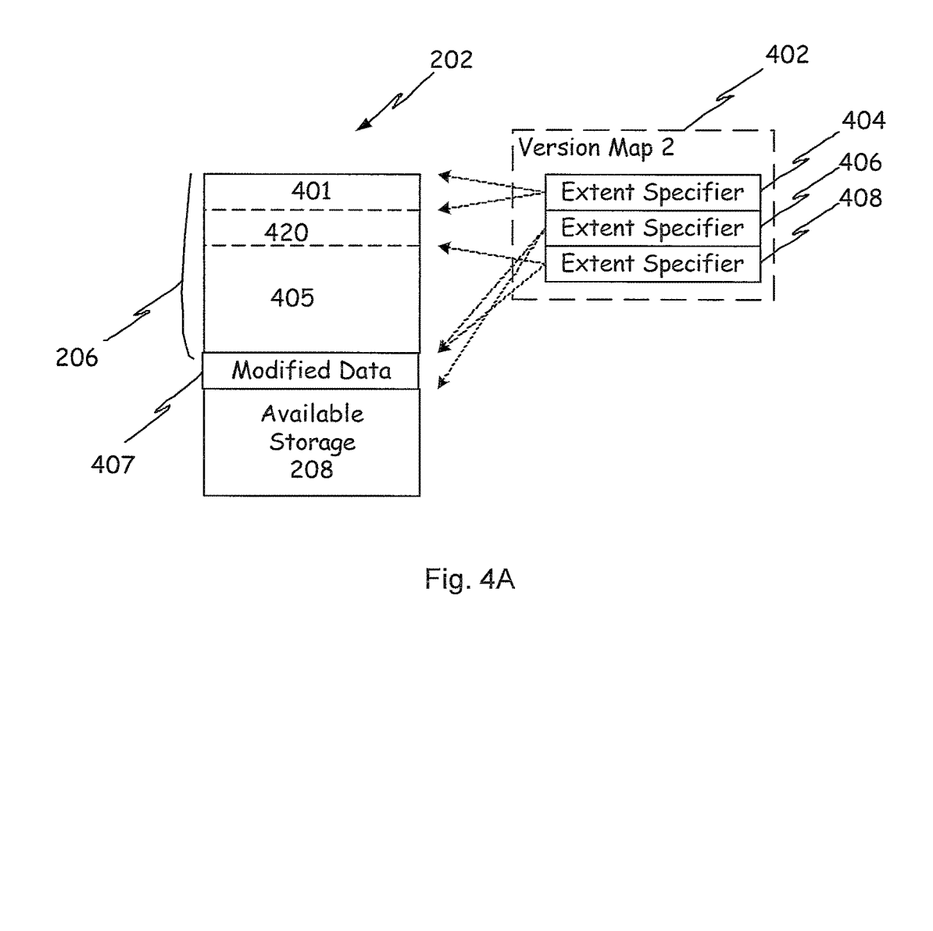
FIG. 4A is a block diagram of an updated cumulative data file and version map that is created after a first region of modified data from the computer system of FIG. 1 is appended to the end of the data of the cumulative data file.

Process block 302 illustrates appending data modified since the last backup to the cumulative data file 202. Incremental backups are performed in such as way as to locate regions of the data that have been modified since the last version map was created. These regions of modified data are appended to the cumulative data file 202 in one embodiment and, as illustrated at process block 304, extent specifiers are created to track the location of the appended data in relation to the original data 206 of the cumulative data file 202. For example, FIG. 4A illustrates the cumulative data file 202 after a new version map is created with a single region of the original data having been modified. A copy of the original unmodified region that was modified since its last backup is identified as 420.

As illustrated in FIG. 4A, three extent specifiers 404, 406, and 408 are created for version map 402. Extent specifier 404 includes a first operand that points to the beginning of the original data 206, and a second operand that defines the length of a data region pointed to by the first operand. In this embodiment, extent specifier 404 points to region 401 of cumulative data file 202. Extent specifier 406 includes a first operand that points to the beginning of the region of modified data 407, and a second operand that defines the length of region 407.

Similar to extent specifier 404, extent specifier 408 points to a region 405 of the original data 206. However, the first operand of extent specifier 408 points to the beginning of the second region of un-modified data in the cumulative data file 202. The second operand of extent specifier 408 points to the end of the original data 206. This location is the same location as the beginning of the region of modified data 407. In other words, extent specifier 408 identifies the remaining unmodified original data of the original data 206. After creating the three extent specifiers 404, 406, and 408, the extent specifiers may be organized as identified in process block 306 of flow diagram 300 and a version map can be prepared as shown in process block 308. Of course, the extent specifiers may be organized as they are created rather than in a separate step as illustrated.

In the FIG. 4A embodiment, the extent specifiers are placed in version map 402 in the order that the data regions of the cumulative data file 202 would be retrieved when a file is restored. Each of the extent specifiers identify a region of the cumulative data file 202 that contains data to be retrieved for the restore. For example, when restoring a file from the cumulative data file 202, the first data region 401 of the file to be restored could be retrieved from the cumulative data file 202 based on the identifying information of the first extent specifier 404. The data from this first data region would be placed on a hard disk, and the second data region 407 could be retrieved from the cumulative data file 202 based on the identifying information of the second extent specifier 406. This second data region 407 would be appended to the first data region 401 on the hard disk. The data region 405 identified by extent specifier 408 would be retrieved and appended to the second data region 407 on the hard disk. At that point the file has been restored on the hard disk.

Figure 4B:
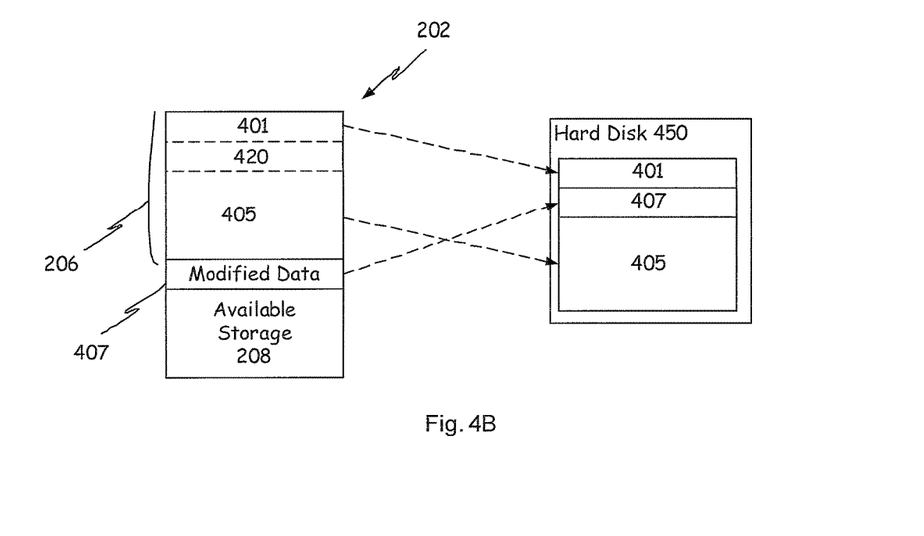
FIG. 4B illustrates mapping from the cumulative data file of FIG. 4A to a restored file in order to show data regions of the restored file relative to the updated cumulative data file of FIG. 4A.

When data is backed up to a logical memory, in a preferred embodiment, the extent specifiers would be ordered such that the data identified by the first extent specifier is the first data region to be restored followed by the data region identified by the second extent specifier and so forth until the last extent specifier identifies the data of the last region of the file to be restored. FIG. 4B illustrates mapping data regions of the updated cumulative data file 202 of FIG. 4A to a file restored on a hard disk 450. Hard disk 450 illustrates a file that has been restored using version map 402 to restore the file. The data regions identified by the extent specifiers of version map 402 may appear at any point in the cumulative data file 202; however, the data regions are ordered on hard disk 450 to form the restored file. For example, as illustrated in FIG. 4B, data region 401 of the cumulative data file 202 appears in memory space before data region 405 which in turn appears before modified data region 407. However, with the version map 402, as data regions 401, 405, and 407 are restored to hard disk 450, modified data region 407 appears after data region 401, but before data region 404.

In another embodiment, extent specifiers could be ordered such that when restoring data regions, the data region in the cumulative data file identified by one extent specifier follows the data region in the cumulative data file identified by the previous extent specifier regardless of the region order that the data appears in the restored file. Extent specifier reorganization in this manner is conducive to retrieving data regions from the cumulative data file when the cumulative data file is stored to a magnetic tape because the tape does not need to be rewound to find the next data region of the cumulative data file needed for the file restoration. However, after regions are retrieved from the cumulative data file, the regions will need to be properly ordered to restore the file. Properly ordering the retrieved data regions may require extent specifiers to include an additional operand to identify a location on a hard disk to restore the data region to the hard disk with respect to all regions being restored to the hard disk.

Figure 4C:
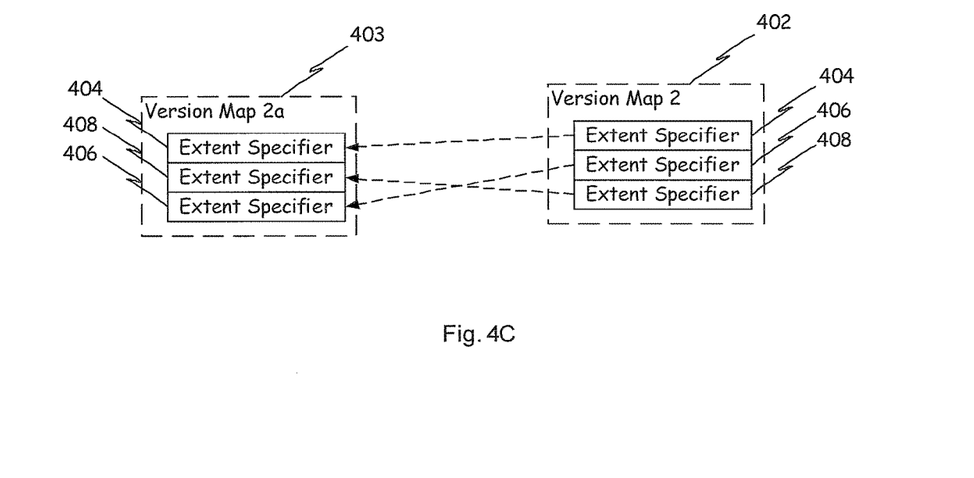
FIG. 4C illustrates modifications that may occur in the version map of FIG. 4A when the cumulative data file is formed on a tape rather than a hard drive.

FIG. 4C illustrates modifications that may occur in the version map 402 of FIG. 4A when the cumulative data file 202 is a logical memory formed on a tape rather than on a hard drive or group of hard drives. Version map 403 is illustrated with respect to the original version map 402. As shown, extent specifiers 406 and 408 of version map 403 are reversed from their order of appearance in version map 402 because version map 403 is created to restore a file from a tape. The reason for the reversal of extent specifiers 408 and 406 is to allow the data regions pointed to by the extent specifiers 404, 408, and 406 to be retrieved sequentially from the cumulative data file 202 for efficient tape readout. Specifically, extent specifier 404 points to the beginning of the tape, i.e., data region 401. Extent specifier 408 points to the next region of valid data on the tape for the version map, i.e., data region 405, and extent specifier 406 points to the final data region of the tape that is being used for the restore, i.e., data region 407. Of course, the retrieved data regions 401, 405, and 407 of the file will need to be properly ordered on its hard disk for a complete restore of the file.

Figure 5:
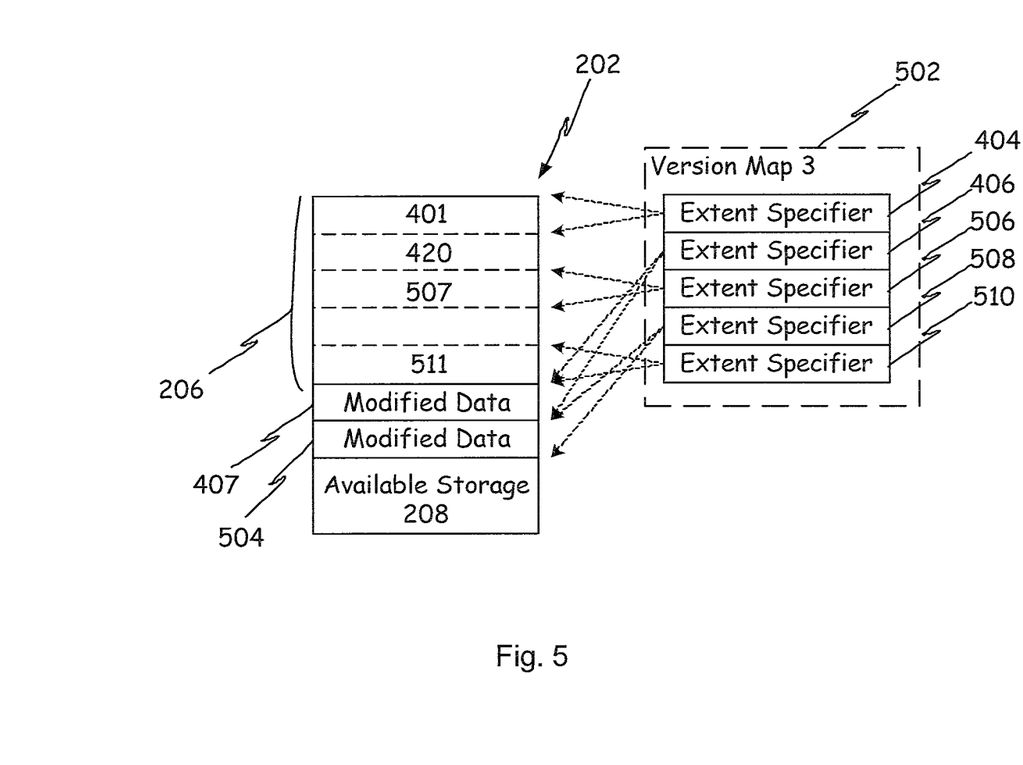
FIG. 5 is a block diagram of yet another updated cumulative data file and version map that is created after a second region of data is modified on the computer system of FIG. 1 and an incremental backup is performed to append the modified data region to the updated cumulative data file of FIG. 4A.

FIG. 5 is a block diagram of another updated cumulative data file 202 and another version map 502 to track the new update. The version map 502 is created during a second incremental backup and after a second region of modified data 504 is appended to the previously updated cumulative data file 202. The version map 502 includes five extent specifiers. The first extent specifier 404 is the same as extent specifier 404 from the version map 402 of FIG. 4 because the corresponding data region 401 of the file has not been modified since the first incremental backup. The second extent specifier 406 is also the same as version map 402 because the corresponding region of the data file, region 407, was not further modified between the creation of version map 402 and version map 502. Of note, extent specifiers 404 and 406 of virtual map 502 may be identical copies of the extent specifiers of virtual map 402.

The third extent specifier 506 of version map 502 is a new extent specifier. The extent specifier 506 points to data region 507 of the original data 206. Although the data of region 507 has not been modified since the last backup, the size of region 405 identified by extent specifier 408 was changed when a portion of the data in that region was modified since the previous incremental backup. Thus, extent specifier 506 is created to identify new data region 507 from the original data 206. The fourth extent specifier 508 identifies modified data region 504 that has been appended to the cumulative data file 202 since the previous update. Finally, to complete the version map 502, the fifth extent specifier 510 identifies the remaining data of the original data 206, i.e., data region 511. The extent specifier 510 was created because the size of the region 511 is new even though the data has not been modified since the previous incremental backup.

Figure 6A:
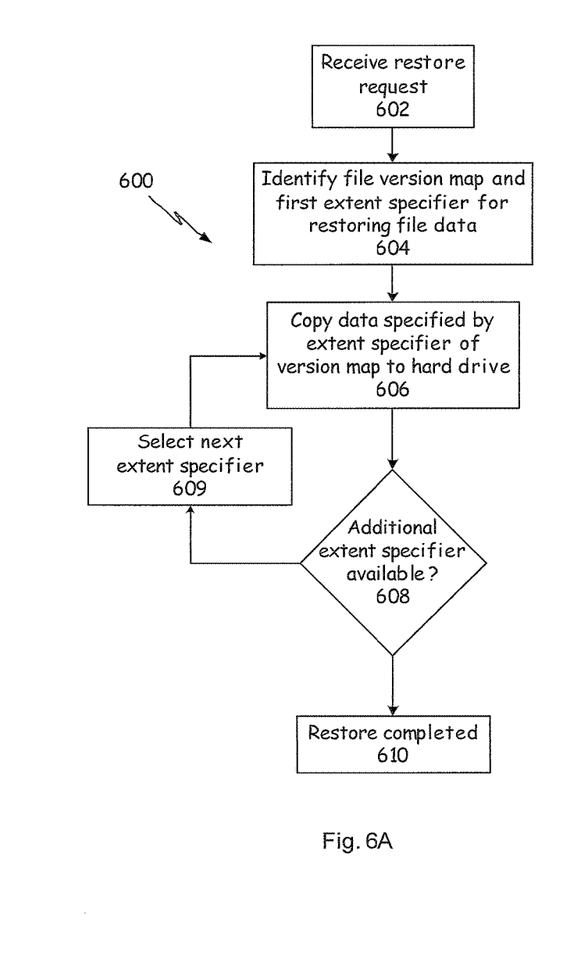
FIG. 6A is a flow diagram showing a process to restore data from a cumulative data file that is saved on a hard disk when using one of the version maps of FIGS. 2 and 4.

FIG. 6A illustrates flow diagram 600 which shows a process to restore a file from the cumulative data file 202 when the logical memory of the cumulative data file stores data at one or more hard drives. The restore process of flow diagram 600 is described herein using the version maps of FIGS. 2 and 4.

With regard to the version map 204 of FIG. 2, when the computer system receives a restore request as indicated at process block 602, a file version map to be used must be identified. Process block 604 shows the file version map being identified and locating the first extent specifier of the version map. When version map 204 is identified as the map to be used to restore the file, a single extent specifier 210 is located. As shown in process block 606, after the data identified by extent specifier 210 is copied from the cumulative data file 202 to an appropriate location on a hard disk, the computer system checks for additional extent specifiers at decision block 608. Since no more extent specifiers are available in version map 204, the restore is then complete as indicated by process block 610.

With regard to version map 402 of FIG. 4, after receiving the restore request at process block 602, the first extent specifier 404 of version map 402 is identified. The data region 401 identified by the extent specifier 404 is copied from the cumulative data file to the appropriate location on the hard drive, and then the computer system decides if an additional extent specifier exists as indicated at decision block 608. Because extent specifier 406 is available in version map 402, extent specifier 406 is selected as indicated by process block 609. Extent specifier 406 identifies the data from modified data region 407 and, as indicated at process block 606, data from region 407 is copied to the appropriate location on the hard drive. The data of region 407 is appended to the copy of the data from region 401 on the hard drive.

At decision block 608, another request is made for the next extent specifier and the computer system determines that extent specifier 408 is available. Extent specifier 408 is selected as indicated at process block 609, and the data pointed to by extent specifier 408 (i.e., data region 405) is copied to the appropriate location on the hard drive and appended to the end of region 407 as illustrated in FIG. 4B. The computer system 700 then determines at decision block 608 that no further extent specifiers are available for restoring data. Thus, as indicated at process block 610, the restore is complete.

Figure 6B:
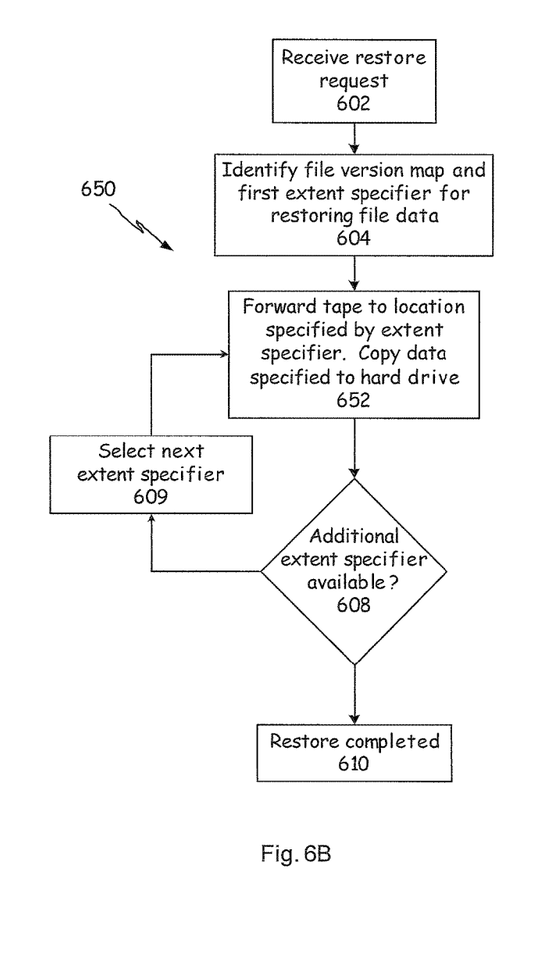
FIG. 6B is a flow diagram showing a process to restore data from a cumulative data file that is saved on a tape when using a version map similar to that of FIG. 5.

FIG. 6B illustrates flow diagram 650 in which data of the cumulative data file is restored to a hard drive from a tape. The restore process of flow diagram 650 is described herein using the version map of FIG. 5.

With regard to version map 502, although version map 502 is illustrated as being organized for restoring data regions in the order that regions appear in the restored file (i.e., organized to restore from a hard drive), restoring from version map 502 will be described as though version map 502 were reorganized to allow data to be restored with a pass of the cumulative data file 202 such as when the cumulative data file 202 is stored on a magnetic tape. As discussed earlier in this disclosure, a pass of the cumulative data file 202 to retrieve data regions for a restore of a file is particularly convenient when restoring from a magnetic tape backup.

Similar to flow chart 600, flow chart 650 begins when a restore request is received at process block 602. At process block 604 a file version map with its first extent specifier is identified for restoring file data. When the logical memory of the cumulative data file 202 is a tape, to retrieve data regions from the cumulative data file with a pass of the tape, the extent specifiers of version map 502 would be organized with extent specifier 404 first. Data region 401 identified by extent specifier 404 appears at the beginning of the cumulative data file 202, so that data region 401 can be retrieved without looking further than the beginning of the cumulative data file on the tape. Process block 652 shows the tape being forwarded to the location specified by the extent specifier; however, in the case of extent specifier 404, no forwarding may be required. Also at process block 652, data identified by extent specifier 404 is copied from the tape to an appropriate location on a hard drive determined by a third operand of the extent specifier.

At decision block 608 the computer system checks for additional extent specifiers in the version map. In the tape backup embodiment of FIG. 6B, an additional extent specifier exists and is selected at process block 609. Since data is being retrieved from tape sequentially, the next extent specifier in the version map is extent specifier 506 because extent specifier 506 identifies the next data region on the tape, i.e., data region 507. Once the data is copied from data region 507, the computer system checks for an additional extent specifier.

An additional extent specifier exists, and to avoid rewinding the tape, data region 511 is the next region to be retrieved from the tape. Because data region 511 is pointed to by extent specifier 510, extent specifier 510 is the next extent specifier of the version map and extent specifier 510 is selected at process block 609. The process of copying the data at process block 652 is repeated for data region 511 and the remaining two regions to be retrieved from the tape would be the modified data region 407 pointed to by extent specifier 406 and modified data region 504 pointed to by extent specifier 508. The version map would be organized such that retrieving these data regions would occur in the order that the regions appear on the tape to avoid rewinding the backup tape.

After all data regions are retrieved from the tape backup, the data regions are organized to restore the file to the requested data state. In one embodiment, these regions are copied from tape to appropriate locations on the hard drive according to a third operand of the extent specifiers. This third operand identifies a memory address on the hard drive to copy the retrieved data region of the extent specifier. Thus, as data regions of a file are being retrieved from tape, the file may have regions of invalid data until the data region having the valid data is retrieved from tape. As indicated at process block 610, when all data regions for a file are retrieved from tape, the file will be restored completely on the hard drive to the requested data state found in the version map.

FIG. 7 illustrates an exemplary block diagram of a computer system 700 for implementing one embodiment of the cumulative data file 202 of the present invention. For example, computer system 700 can be client computer systems, host computer systems, or even network and storage appliances. Computer system 700 includes a processor 702 and a memory 704 coupled together by communications bus 705. Processor 702 can be a single processor or a number of individual processors working together. Memory 704 is typically random access memory (RAM), or some other dynamic storage device, and is capable of storing instructions to be executed by the processor, e.g., mapping module 706 that may be used for maintaining version maps and the cumulative data file 202. Memory 704 is also used for storing temporary variables or other intermediate information during the execution of instructions by the processor 702.

Those having ordinary skill in the art will readily recognize that the techniques and methods discussed herein can be implemented in software using a variety of computer languages, including, for example, traditional computer languages such as assembly language, Pascal, and C; object oriented languages such as C++ and Java; and scripting languages such as Perl and Tcl/Tk. Additionally, the cumulative data file 202 can be stored in the computer system 700 using a variety of computer readable media including electronic media (e.g., flash memory), magnetic storage media (e.g., hard disk 708, a floppy disk, etc.), optical storage media (e.g., CD-ROM 710), a network storage media 712 (e.g., accessible via a network coupled to network interface 714).

Computer system 700 includes devices such as keyboard & mouse 716, SCSI interface 718, network interface 714, graphics & display 720, hard disk 708, and CD-ROM 710, all of which are coupled to processor 702 by communications bus 722. It will be apparent to those having ordinary skill in the art that computer system 700 can also include numerous elements not shown in the figure, such as additional storage devices, communications devices, input devices, and output devices, as illustrated by the ellipsis shown. Another example of such an additional computer system device is a fibre channel interface.

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

What is claimed is:

1. A method of restoring data from a logical memory, the method comprising:
   receiving a request to restore a file,
   selecting a first version map and a cumulative data file (CDF), wherein
      the CDF comprises original unmodified data, modified data, and an available storage portion, and
      the first version map comprises a plurality of extent specifiers, wherein each of the plurality of extent specifiers identifiers a region of the logical memory corresponding to either the original unmodified data, the modified data, or a region of the available storage portion;
   accessing the first version map;
   reorganizing the extent specifiers to correspond to an order in which the regions of the logical memory are stored, wherein
      the order enables restoration of a file using a single, linear pass of a storage medium; and
   restoring the file, wherein
      the restoring comprises copying data from the logical memory according to the extent specifiers by performing a single, linear pass of the storage medium.

2. The method of claim 1, wherein
   each map among a plurality of maps represents a data state of a file at a different particular point in time.

3. The method of claim 1, further comprising:
   retrieving mapped data portions from the logical memory in an order that the mapped data portions appear in the logical memory.

4. The method of claim 1, further comprising:
   retrieving data portions from the logical memory in the order that the data portions appear in the logical memory regardless of whether the data portions hold a copy of a modified first portion.

5. The method of claim 1, further comprising:
retrieving mapped data portions from the logical memory in an order that the mapped data portions appear in a file being restored.

6. A non-transitory computer-readable storage medium comprising instructions executable by one or more processors to:
subsequent to a cumulative data file (CDF) and a first version map having been created, receive a request to restore a file, wherein
the CDF was created based on data that had not been modified since a previous backup ("unmodified data"),
the CDF was subsequently modified based on data that had been modified since the previous backup ("modified data"),
the first version map was created based on the unmodified data, and
a second version map was subsequently created on the modified data;
select the CDF and the first version map, wherein
the CDF comprises the unmodified data, the modified data, and an available storage portion, and
the first version map comprises a plurality of extent specifiers, wherein
each of the plurality of extent specifiers identifies a region of a logical memory corresponding to either the original unmodified data and a region of the available storage portion;
access the first version map;
reorganize the extent specifiers to correspond to an order in which the regions of the logical memory are stored, wherein
the order enables restoration of a file using a single, linear pass of a storage medium; and
restore the file, wherein
restoring the file comprises copying data from the logical memory according to the extent specifiers by performing a single, linear pass of the storage medium.

7. The non-transitory computer-readable storage medium of claim 6, wherein
each map among a plurality of maps represents a data state of a file at a different particular point in time.

8. The non-transitory computer-readable storage medium of claim 6, wherein the instructions are further executable to:
retrieve mapped data portions from the logical memory in an order that the mapped data portions appear in the logical memory.

9. The non-transitory computer-readable storage medium of claim 6, wherein the instructions are further executable to:
retrieve data portions from the logical memory in the order that the data portions appear in the logical memory regardless of whether the data portions hold a copy of a modified first portion.

10. The non-transitory computer-readable storage medium of claim 6, wherein the instructions are further executable to:
retrieve mapped data portions from the logical memory in an order that the mapped data portions appear in a file being restored.

11. A system comprising:
one or more processors; and
a memory coupled to the one or more processors, wherein the memory stores program instructions executable by the one or more processors to:
subsequent to a cumulative data file (CDF) and a first version map having been created, receive a request to restore a file, wherein
the CDF was created based on data that had not been modified since a previous backup ("unmodified data"),
the CDF was subsequently modified based on data that had been modified since the previous backup ("modified data"),
the first version map was created based on the unmodified data, and
a second version map was subsequently created on the modified data;
select the CDF and the first version map, wherein
the CDF comprises the unmodified data, the modified data, and an available storage portion, and
the first version map comprises a plurality of extent specifiers, wherein
each of the plurality of extent specifiers identifies a region of a logical memory corresponding to either the original unmodified data and a region of the available storage portion;
access the first version map;
reorganize the extent specifiers to correspond to an order in which the regions of the logical memory are stored, wherein
the order enables restoration of a file using a single, linear pass of a storage medium; and
restore the file, wherein
restoring the file comprises copying data from the logical memory according to the extent specifiers by performing a single, linear pass of the storage medium.

12. The system of claim 11, wherein
each map among a plurality of maps represents a data state of a file at a different particular point in time.

13. The system of claim 11, wherein the instructions are further executable to:
retrieve data portions from the logical memory in the order that the data portions appear in the logical memory regardless of whether the data portions hold a copy of a modified first portion.

14. The system of claim 11, wherein the instructions are further executable to:
retrieve mapped data portions from the memory in an order that the mapped data portions appear in a file being restored.

* * * * *